United States Patent [19]

Nichols et al.

[11] 4,227,900
[45] Oct. 14, 1980

[54] APPARATUS FOR FILTERING GAS STREAMS

[76] Inventors: John T. Nichols; Horace S. White, both of 15 Metropolitan Ave., Nunawading, 3131, Victoria, Australia

[21] Appl. No.: 859,162

[22] Filed: Dec. 9, 1977

[51] Int. Cl.² .................... B01D 46/30; B01D 46/46
[52] U.S. Cl. .................................... 55/288; 55/287; 55/294; 55/302; 55/323; 55/325; 55/350; 55/444
[58] Field of Search .............. 55/294, 323, 350, 432, 55/319, 325, 444, 268, 302, 287, 282, 288

[56] References Cited

U.S. PATENT DOCUMENTS

| 461,801 | 10/1891 | Radkey | 55/349 |
|---|---|---|---|
| 705,865 | 7/1902 | Puckler | 55/325 |
| 1,807,983 | 6/1931 | Hegan et al. | 55/325 |
| 1,838,737 | 12/1931 | Boynton et al. | 55/325 |
| 2,059,673 | 11/1936 | Watson | 55/444 |
| 3,535,851 | 10/1970 | Riemsloh | 55/294 |
| 3,594,991 | 7/1971 | Berz | 55/294 |
| 3,646,595 | 2/1972 | Williams | 55/350 |
| 3,897,228 | 7/1975 | Berz | 55/350 |
| 3,917,472 | 11/1975 | Berz | 55/282 |
| 4,000,995 | 1/1977 | Morris | 55/350 |
| 4,026,687 | 5/1977 | Berz | 55/350 |

FOREIGN PATENT DOCUMENTS 580167 10/1924 France ..................................... 55/323

Primary Examiner—Frank W. Lutter
Assistant Examiner—Gregory N. Clements
Attorney, Agent, or Firm—Murray & Whisenhunt

[57] ABSTRACT

Apparatus for filtering a gas stream including a common manifold to which, in use, gas to be filtered is passed, a plurality of gas outlets from said manifold, a plurality of particle separators adapted to remove particles from said gas stream prior to exiting from said gas outlets and wherein said particle separators are adapted to deliver particles separated from said gas stream to said manifold, and a particle outlet from said manifold.

10 Claims, 7 Drawing Figures

APPARATUS FOR FILTERING GAS STREAMS

BACKGROUND OF THE INVENTION

1. Field of the Invention

This invention relates to method and apparatus for cleaning gas.

2. Description of the Prior Art

Reference is made to U.S. Pat. Nos. 3,594,991; 3,917,472; and Re. 28,396.

SUMMARY OF THE INVENTION

The present invention provides apparatus for filtering a gas stream including a common manifold to which, in use, gas to be filtered is passed, a plurality of gas outlets from said manifold, a plurality of particle separators adapted to remove particles from said gas stream prior to exiting from said gas outlets and wherein said particle separators are adapted to deliver particles separated from said gas stream to said manifold, and a particle outlet from said manifold.

PREFERRED ASPECTS OF THE INVENTION

A conveyor is preferably provided to carry particles away.

The apparatus preferably includes a single screw conveyor adapted to remove particles deposited in said manifold.

Said particle separators preferably include a plurality of baffles. These baffles are preferably vertically extending. In the latter instance, the baffles are preferably located to define spaces within said particle separators in which particles will be deposited and said spaces are preferably open at their bottoms of said manifold whereby to provide an egress to the manifold for particles.

The baffles are preferably so located as to provide venturi passages through said particle separators. In a preferred instance said baffles are V-shaped in cross-section and are arranged in pairs with one V-shape adjacent the manifold having its arms received within the arms of another V-shape adjacent the respective said gas outlet.

The apparatus preferably also includes a further particle separator connected to each said gas outlet. Those further particle separators are preferably of a type able to be backwashed with gas. Backwashing gas, which will contain particles, may be passed through said gas outlets and into said manifold through the first mentioned particle separators which may serve to cause a separation of particles. However, as the first mentioned particle separators may not be as effective in particle separation in reverse gas flow conditions or because contamination of an outlet side surface may result, an alternative is to direct backwashing gas from said further particle separators into the manifold without first passing through the respective first mentioned particle separators. Such backwashing gas will have at least some of the particles carried thereby separated therefrom by passing through the first mentioned particle separators from said manifold.

Valve means may be provided to direct backwashing gas from said further particle separators to pass to said manifold without first passing through the first mentioned particle separators.

Said manifold preferably includes sloping side walls to direct particles towards said particle outlet.

Said manifold is preferably longitudinally extending and said gas outlets and the first mentioned particle separators are spaced apart along the length thereof. It is particularly preferred that the first mentioned particle separators are disposed on opposite sides of an imaginary longitudinally extending plane passing through the middle of said manifold.

Said further particle separators preferably include a support for a filter bed of particulate material.

To backwash the filter bed means may be provided to pass a gas stream through the filter bed from below which being counter-current to the direction of flow through the filter bed during filtering. Further, it is desirable to disturb at least the upper surface of the bed with a gas stream issuing from a nozzle located above the bed.

In a particularly preferred instance gas is passed through the nozzle and the nozzle is moved over the filter bed to disturb the upper surface thereof.

The gas stream which is used to disturb the filter bed is preferably directed thereat at a pressure of from 30 to 100 psig with 40 to 60 psig being most preferred.

In a particularly preferred instance a number of nozzles are mounted on an arm which is rotated above the filter bed. The nozzles may be so directed as to cause the arm to so rotate.

However, since the nozzles may produce furrows in the upper surface of the bed and, since this is undesirable, it is preferred that towards the end of the filter bed cleaning cycle the method is conducted in such a way as to smooth out the upper surface of the filter bed. This may be done by using such a gas pressure as is necessary to fluidize the upper surface of the filter bed and the rapidly discontinuing fluidizing so that the fluidized particulate material falls to make a smooth surface. Alternatively or additionally, the nozzles may be raised with respect to the upper surface and this, by producing broader air streams, will tend to smooth out furrows. Alternatively or additionally, the nozzles may be moved rapidly over the surface and this too will tend to smooth out furrows. Alternatively or additionally, the nozzles may be supplied from a chamber which is itself supplied by a compressor outputing less gas than the nozzles will output and thus, over a period of time there will be a gradual drop in pressure and flow through the nozzles.

A construction of gas cleaning apparatus in accordance with this invention will now be described with the aid of the accompanying drawings.

DESCRIPTION OF THE VIEW OF THE DRAWINGS

DETAILED DESCRIPTION

Figure 1:
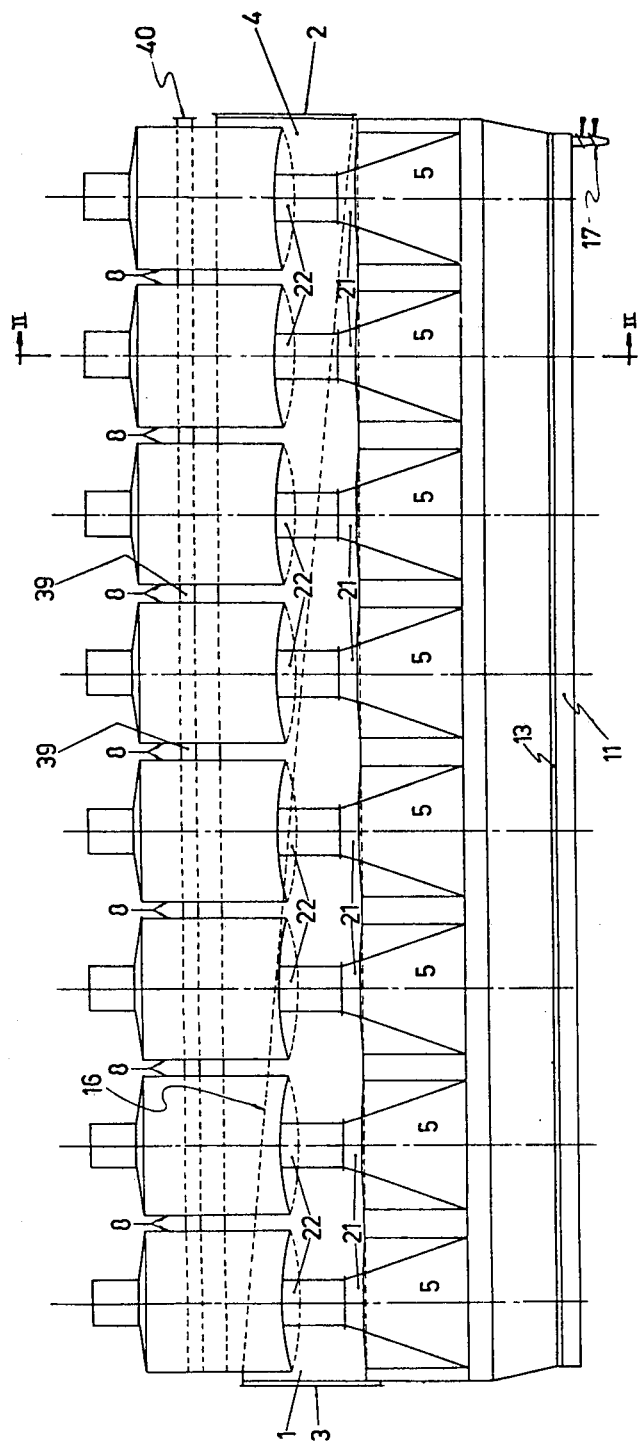
FIG. 1 is a side elevation of the apparatus.
Figure 2:
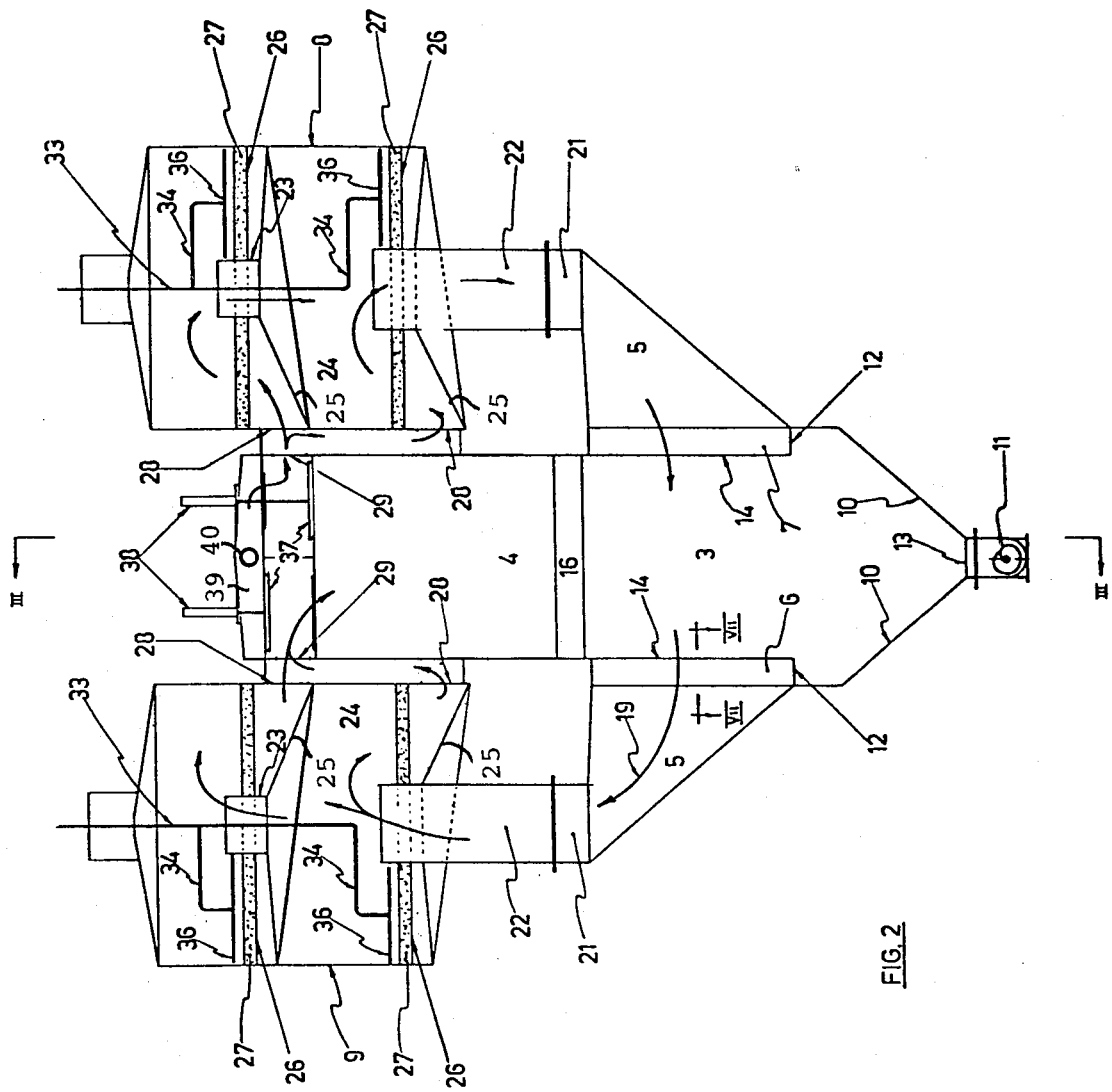
FIG. 2 is a cross-section approximately on line II—II in FIG. 1.
Figure 3:
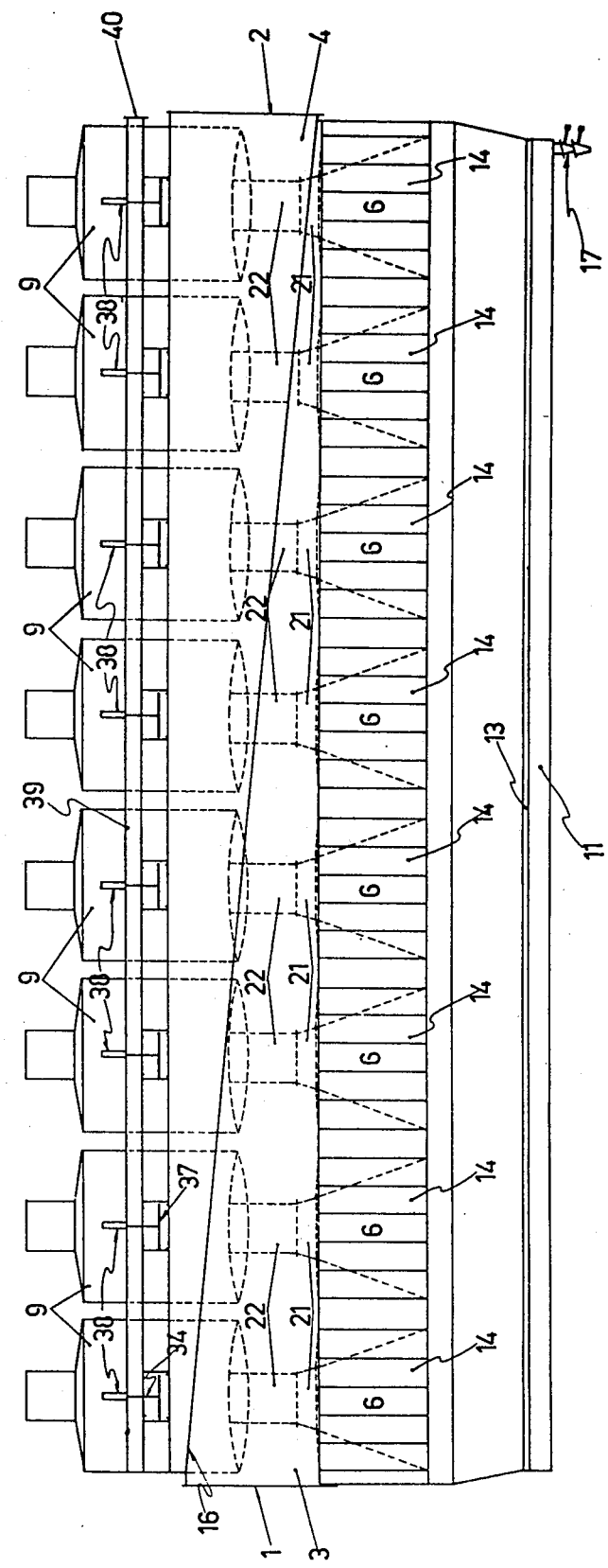
FIG. 3 is a cross-section approximately on line III—III in FIG. 2.
Figure 4:
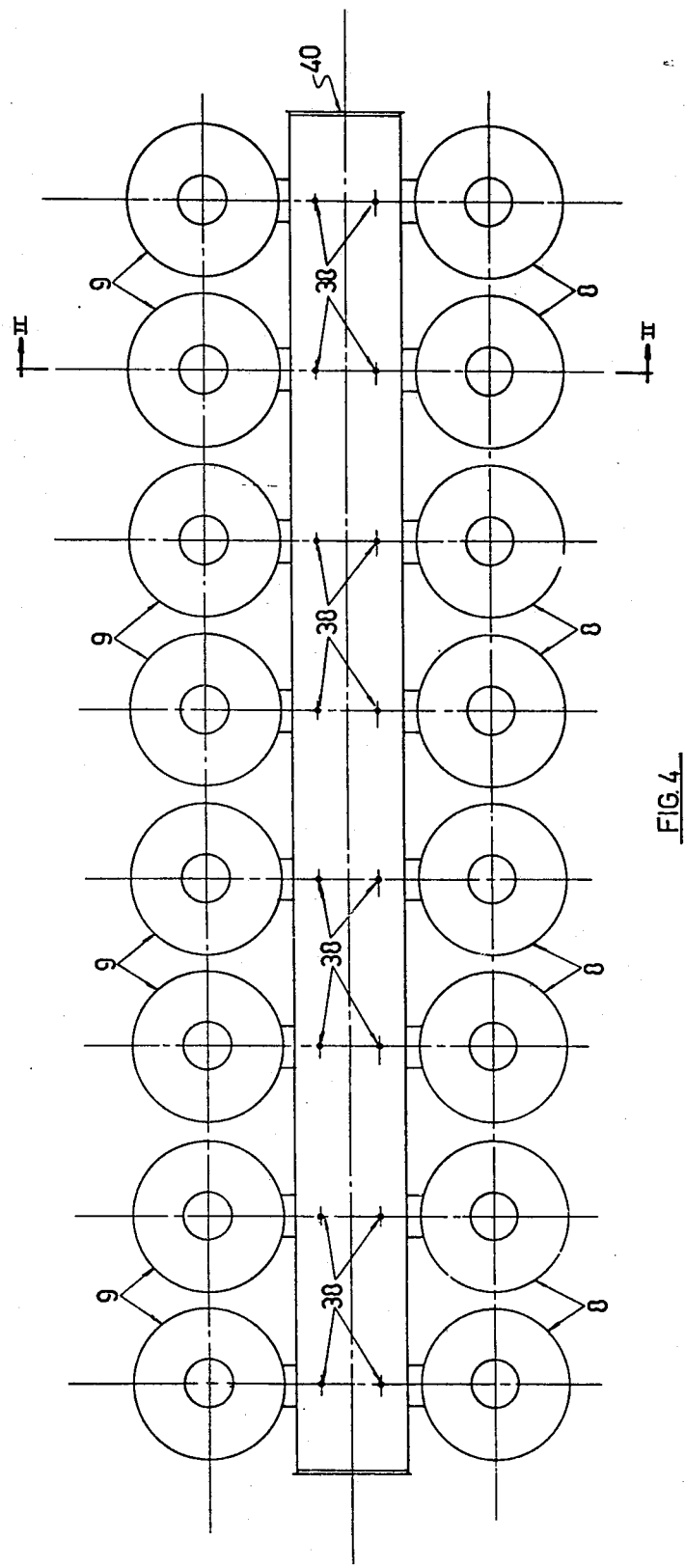
FIG. 4 is a plan view of the apparatus.

FIGS. 1–5 and 7 of the drawings show one embodiment of gas cleaning apparatus of the invention. Referring to FIGS. 1 and 2, the apparatus comprises a dirty gas inlet 1, a clean gas outlet 2, a dirty gas manifold 3, a clean gas manifold 4, a first bank of venturi baffle dust collectors 6, a second bank of venturi baffle dust collectors 7, a first bank of gravel bed filters 8, a second bank of gravel bed filters 9 and a screw conveyor 11.

It will be observed that collectors 6 and 7 are parallel to one another, are located on opposite sides of the manifold 3 and have particle outlets 12 which feed to inclined walls 10 of the manifold 3 which in turn deliver to an outlet 13 and thence to the conveyor 11.

In consequence of the location of the collectors 6 and 7 and their outlets 12, the location of the dirty gas manifold 3 between the banks of collectors 6 and 7 and the inclination of the walls 10, only one screw conveyor is used to remove all that dust that falls in the manifold 3 per se and in the collectors 6 and 7.

The dirty gas manifold 3 has the aforesaid inlet 1 and a plurality of outlets 14 at which the collectors 6 and 7 are located. The dirty gas manifold 3 is separated from the clean gas manifold 4 by a wall 16 and it is to be observed that that wall is inclined so as to, respectively, reduce and increase the cross-section of the dirty gas and clean gas manifolds 3 and 4 along their lengths (from left to right in FIG. 1).

The dirty gas manifold 3 also has the aforesaid outlet 13 to which particles deposited in the manifold 3 fall. The conveyor 11 is provided with a non-return outlet valve 17.

The outlets 14 of the manifold 3 communicate through the collectors 6 and 7 with ducts 5 and dirty gas passes into those chambers through the collectors 6 and 7 as is shown by arrow 19.

In the collectors 6 and 7 particles are deposited and fall via the outlets 12 and walls 10 to the outlet 13 and to the conveyor 11.

Gas passes out of the collectors via outlets 21 to the gravel bed filters.

Two gravel bed filters are mounted above each collector 6 and 7 and each comprises a gas inlet. The lower gravel bed filters have inlets 22 which communicate with the outlets 21 and the upper gravel bed filters have inlets 23 which communicate with chambers 24 above the lower gravel bed filters.

Each gravel bed filter comprises a support 26, a gravel bed 27 and an outlet 28. The outlets 28 communicate with passages 29 to the clean gas manifold 4.

In use of the apparatus to clean gas, dirty gas enters the inlet 1 and passes into manifold 3. Flow of dirty gas may be achieved by blowing the dirty gas or by applying suction at the clean gas outlet 2. In manifold 3 some particles separate and pass to conveyor 11. Gas from manifold 3 passes to the collectors 6 and 7 and there more particles separate out and are passed to the conveyor 11. Gas from the collectors 6 and 7 passes to and through the gravel bed filters from above where further particles separate out and from there to the clean gas manifold 4 and out via the outlet 2. The above is, generally, the gas cleaning cycle.

The gravel bed filters also include a housing at the top thereof which contains a motor and drive (not shown) which are capable of rotating pipe 33. The pipe is supplied with compressed gas when it is desired to backwash the gravel bed filters. Extending from the pipe 33 is an arm 34 for each filter and the arms 34 terminate in manifolds 36 which have a plurality of gas exit nozzles (not shown).

Mounted on the upper surface of the clean gas manifold 4 is a number of valves 37 and operators therefor 38.

The valves 37 are each locatable in one of two positions, a first position, which is shown on the left in FIG. 2, in which passages 29 are open to the manifold 4 and are not open to chamber 39, a second position, which is shown on the right in FIG. 2, in which passages 29 are open to chamber 39 but not open to manifold 4.

When it is desired to backwash any two superimposed gravel bed filters the valve 37 in respect thereof is moved from said first position, which is the position that the valve is normally in when gas is being cleaned in those gravel bed filters, to said second position. Clean air from an outside source is then delivered by a backwash fan of power appropriate to backwashing into inlet 40 of chamber 39 and then in the direction of the arrows on the right in FIG. 2 (the opposite direction to the arrows on the left in FIG. 2), through the gravel bed filters to be backwashed, through their associated collectors 6 or 7 and then into the dirty gas manifold 3.

At the same time, the pipe 33 is rotated and compressed gas is supplied to the nozzles. The gas exiting from the nozzles will disturb the surface of the gravel beds 27 so that particles deposited thereon will be removed.

Particles which are backwashed will tend to separate out in the associated collectors 6 or 7 or in the manifold 3 but some will be collected by other of the collectors 6 and 7 and in other of the gravel bed filters.

The backwashing of each two superimposed gravel bed filters may be done at predetermined intervals, irregularly or in response to criteria (e.g., back pressure) but in a system using 12 collectors 6 and 7 and 24 gravel bed filters it will be usual for two superimposed gravel bed filters to be backwashed at any one time.

Figure 5:
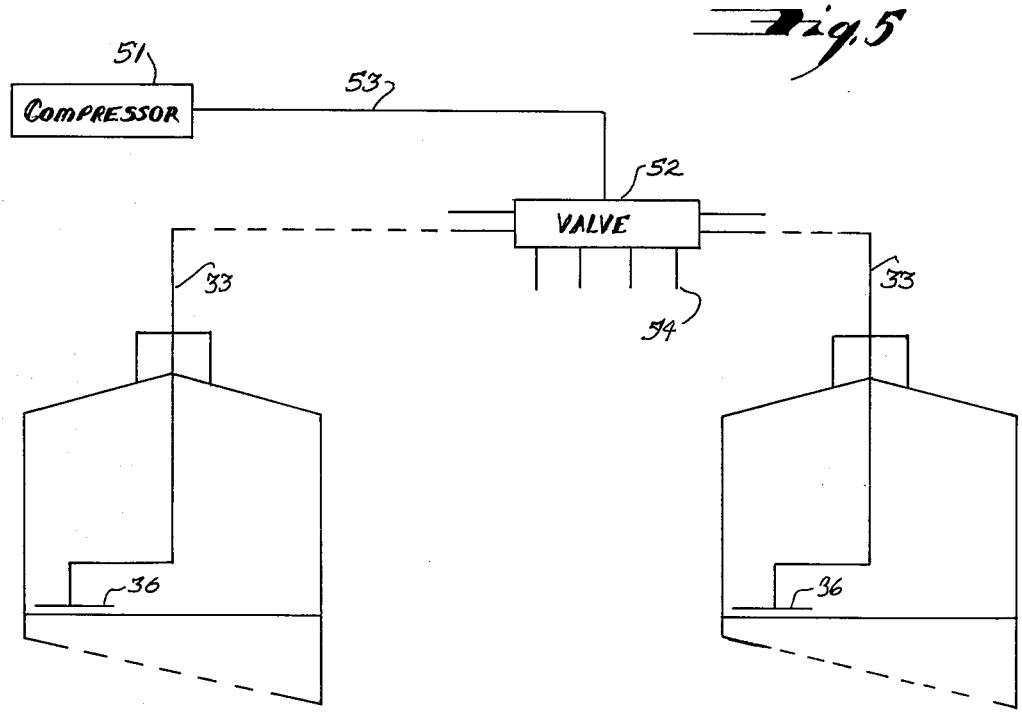
FIG. 5 is a schematic view of part of the apparatus.

One apparatus for supplying compressed gas to the pipe 33 is shown in FIG. 5 and comprises a compressor 51 which is connected to a valve 52 by a line 52. The valve 53 has further lines 54 connected thereto (one for each pipe 33) and by selectively operating the valve 52 compressed gas may be supplied to a selected one of the pipes 33. In this instance the compressor 51 is capable of selectively delivering compressed gas at a rate which will disturb or fluidize the gravel beds.

Figure 7:
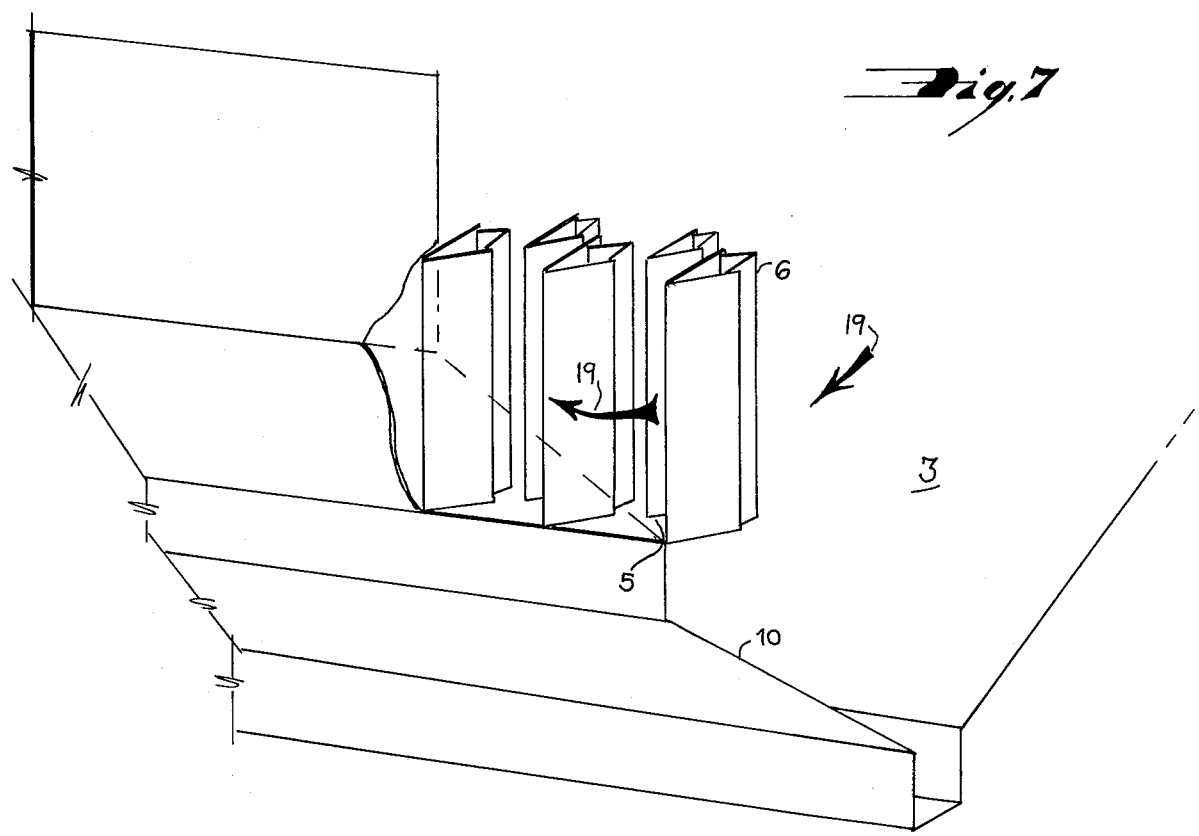
FIG. 7 is a perspective view of part of the apparatus showing the arrangement of the baffles.

The construction of the collectors 6 and 7 is Best seen in FIG. 7 which is a perspective view which shows collector 6 to comprise a plurality of V-shaped members 51 and 52 which together define venturi passages 53 and chambers 54. In use, dust laden gas enters as shown by the arrow 55, the passages 53 cause the gas to increase in velocity and the particles to concentrate adjacent the members 51 and 52 and pass into the chambers 54 from where they can drop by gravity to outlets 12.

The apparatus of the present invention is economical in that it uses only one screw conveyor and in that the motors (not shown) for rotating the pipes 33 do not require to be of high power. At the same time the apparatus is effective in cleaning gas and also in cleaning the gravel bed filters in backwashing.

Note also that the walls 25 defining parts of the gravel bed filter chambers are inclined so that pressure remote from the inlets 28 is kept similar to pressure adjacent the inlets 28 and thus stagnant air is reduced.

Note also the simple shape and form of chambers 5 and compare with the cyclones of Ser. No. 731,798 (Brett & Walker) and U.S. Pat. Nos. Re. 28,396, 3,594,991 and 3,917,472 of Berz. Note in particular how manifold 3 serves a multi-collection function.

The gravel beds will usually contain 6 to 8 Tyler mesh filter medium. The gas from the nozzles will usually be supplied at 30 to 100 psi. Backwashing will usually be performed for 3 to 5 minutes. The backwash gas pressure in chamber 39 will usually be 6" watergauge or less.

The apparatus of this invention is particularly useful in agglomerating dust; particularly dust at temperatures of above 500° F. Illustrative uses are for kiln exhausts such as in the cement and lime industries and for trapping fly ash from power generating stations.

The apparatus described with respect to FIGS. 1 to 5 and 7, when being backwashed, passes backwashing gas through the collectors 6 and 7 from the ducts 5. To an extent the collectors 6 and 7 will remove particles therefrom which can pass to outlets 12 but the extent of removal is not necessarily as great as is desired having regard to the necessity to supply energy to push the gas through the collectors 6 and 7 from the chambers 5. Further, in backwashing particles may be deposited on surfaces of the collectors adjacent duct 5 and in duct 5 and thus backwashing efficiency may be reduced as those particles may be immediately returned to the gravel bed filters on recommencement of the normal filter operation.

Accordingly, in a modified apparatus, means is provided to by-pass the collectors 6 and 7 during backwashing.

Figure 6:
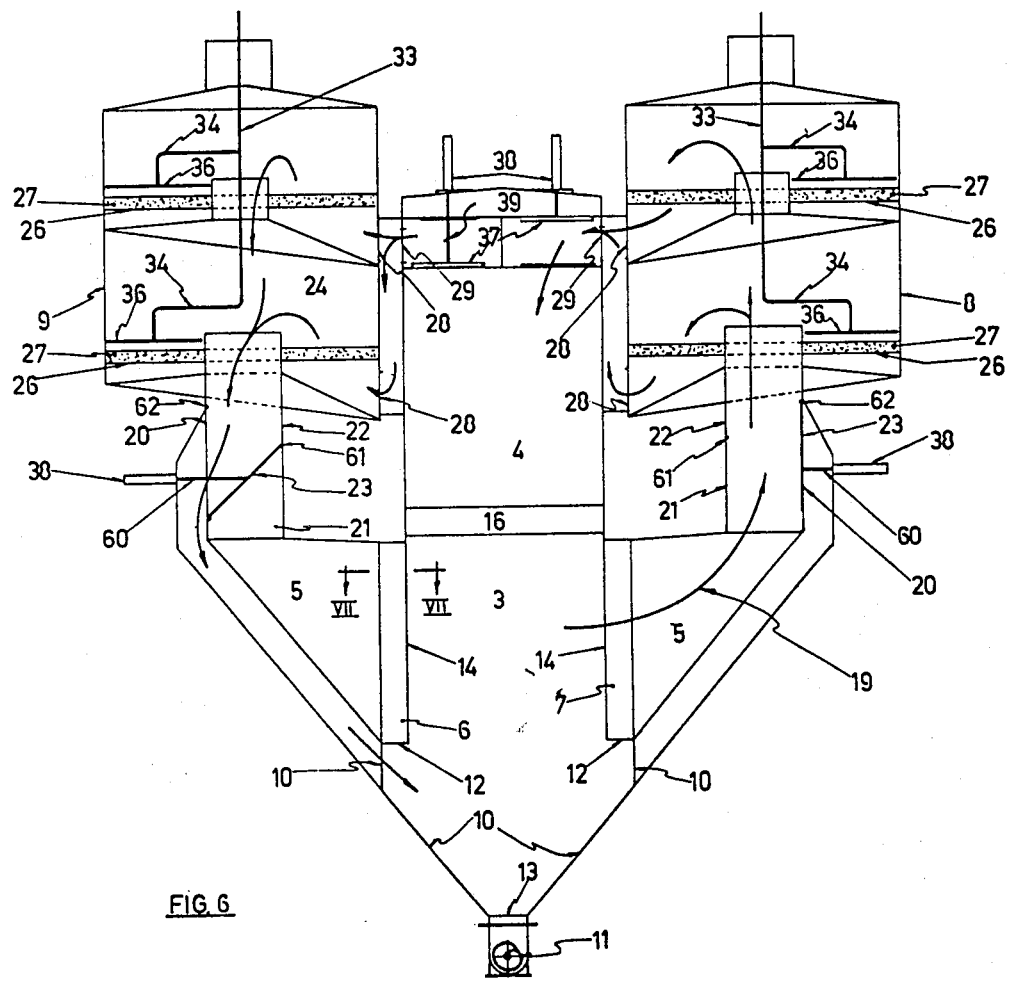
FIG. 6 is a view corresponding to FIG. 2 but of a modified apparatus.

That modified apparatus is shown in FIG. 6 and except in respects detailed below is similar to and has similar integers as the apparatus shown in FIGS. 1-5 and 9 and it is to be noted that like reference numerals denote like parts.

The means to by-pass the collectors 6 and 7 during backwashing includes valve means comprising an operator 38', a stem 60, a valve closure 23, valve seats 61 and 62, an inlet 20 and an outlet 10.

The valve closure can be positioned as shown for example on the right in FIG. 6. In this condition, the filtering condition, dirty gas can pass from the manifold 3 through collector 7, into chamber 5, through inlet 20, through outlet 21 and through inlet 22 to the gravel bed filters. It will be realized that in this condition dirty gas passes through the collector 6 to be cleaned thereby. In this condition, the outlet 10 is closed and the closure 23 is seated on the seat 61.

Operating the operator 38', which will be linked to the associated operator 38, will cause the closure 23 to seat against seats 62 and take up the condition shown for example on the left in FIG. 6. In this condition, the backwashing condition, clean air can pass through the gravel bed filters to clean them in like manner as described with respect to FIGS. 1-5 and 9, and pass via inlet 22 (which functions as an outlet), via outlet 21 (which functions as an outlet) and into the manifold 3 via outlet 10. Thus, the collector 7 and duct 5 is by-passed.

This modification is considered preferred in a number of situations.

Modifications and adaptations may be made to the above described without departing from the spirit and scope of this invention which includes every novel feature and combination of features disclosed herein.

What is claimed is:

1. Apparatus for separating particles from a gas stream, comprising:
    (a) a common manifold for carrying a gas stream containing particles to be separated, said common manifold extending along a longitudinal axis of said apparatus;
    (b) sole conveyor means operatively connected to said common manifold for conveying away particles separated from said gas stream;
    (c) baffle particle separator means in communication with said common manifold means for separating particles from said gas stream;
    (d) further particle separator means for separating particles from said gas stream issuing from said common manifold, said further particle separator means being in communication with said baffle particle separator means via a duct means for transporting said gas stream between said baffle particle separator means and said further particle separator means, said further particle separator means including a filter bed support and a filter bed of particulate material supported on said support; and
    (e) backwashing means operatively connected to said further particle separator means for removing particles from said further particle separator means to give backwashed particles, by passing backwashing gas through said further particle separator means in a direction opposite to the direction of the flow of said gas stream through said further particle separator means for separating particles from said gas stream;
said baffle particle separator means defining sidewalls of said common manifold, said common manifold being in direct communication with said duct means, whereby re-entrainment in said duct means and said further particle separator means of particles separated from said gas stream is substantially prevented.

2. Apparatus according to claim 1, wherein said sole conveyor means is a screw conveyor.

3. Apparatus according to claim 1, wherein said backwashed particles are directed through said duct means to said common manifold via said baffle particle separator means causing an at least partial separation of said backwashed particles from said backwashing gas in said baffle particle separator means.

4. Apparatus according to claim 3, wherein said baffle particles separator means include vertically extending elements which are V-shaped in cross-section and are arranged in pairs with one V-shaped element nearer said common manifold having its arms received within the arms of another V-shaped element remote from said common manifold.

5. Apparatus as claimed in claim 1, and further including directing means for directing said backwashed particles to said common manifold without passing through said baffle particle separator means.

6. Apparatus according to claim 5, wherein said backwashed particles are directed to said common manifold through passages communicating directly with said common manifold, not through said baffle particle separator means.

7. Apparatus according to claim 6, wherein said directing means includes valve means for opening and closing said duct means, said passages being opened when said duct means are closed by said valve means.

8. Apparatus according to claim 1, wherein said baffle particle separator means include vertically extending elements which are V-shaped in cross-section and are arranged in pairs with one V-shaped element nearer said common manifold having its arms received within the arms of another V-shaped element remote from said common manifold.

9. Apparatus according to claim 1, wherein said duct means are comprised of planar walls except where connected to said further particle separator means.

10. Apparatus according to claim 1, wherein said further particle separator means include at least one inclined surface diverging from said further particle separator means toward said common manifold for reducing gas pressure differential between said further particle separator means and said common manifold.

* * * * *